Figure 1:
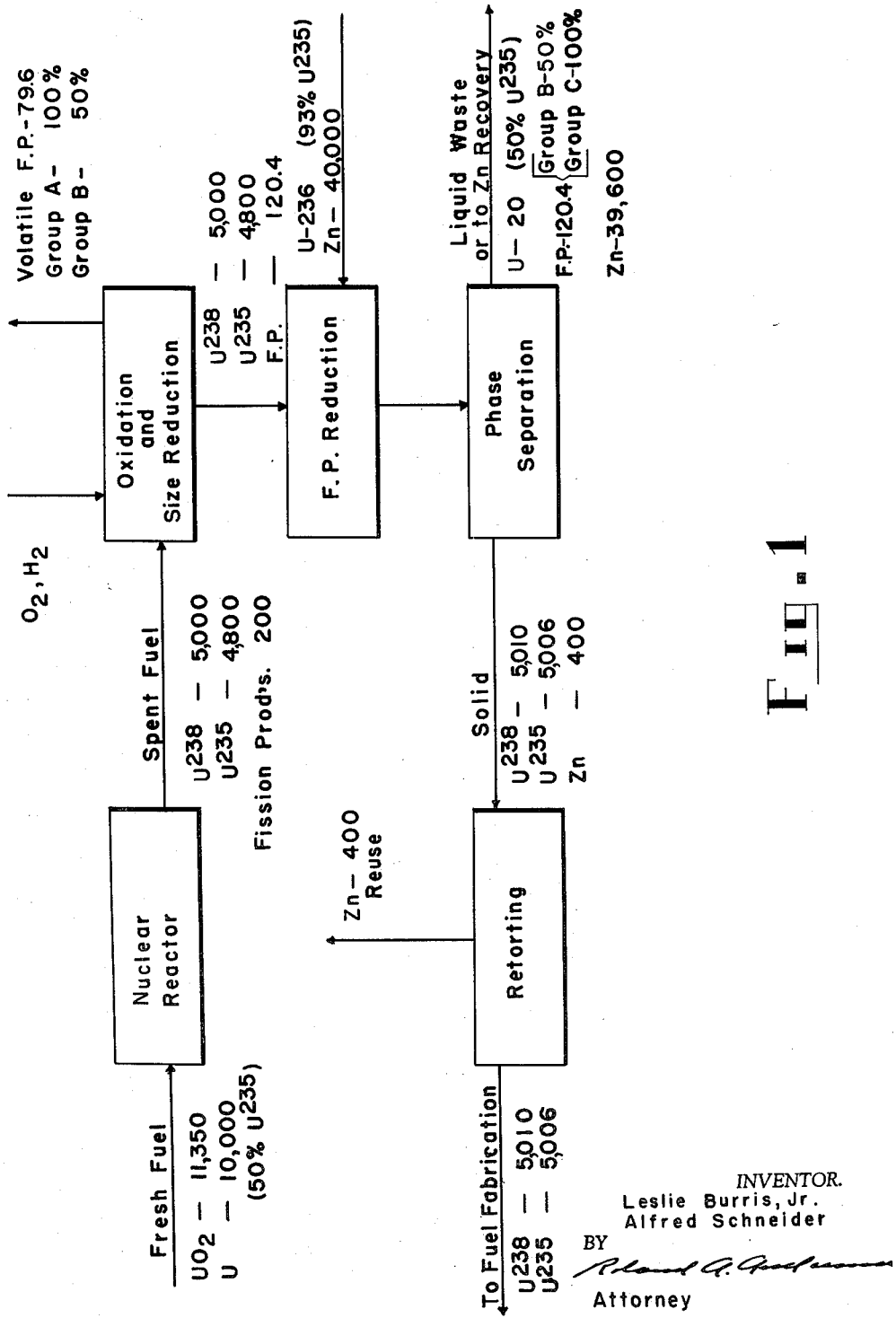

Feb. 27, 1962 L. BURRIS, JR., ETAL 3,023,097
REPROCESSING URANIUM DIOXIDE FUELS
Filed Nov. 23, 1959 2 Sheets-Sheet 1

INVENTOR.
Leslie Burris, Jr.
Alfred Schneider
BY
Attorney

United States Patent Office 3,023,097
Patented Feb. 27, 1962

3,023,097
REPROCESSING URANIUM DIOXIDE FUELS
Leslie Burris, Jr., and Alfred Schneider, Naperville, Ill., assignors to the United States of America as represented by the United States Atomic Energy Commission
Filed Nov. 23, 1959, Ser. No. 854,989
4 Claims. (Cl. 75—84.1)

The invention relates to a novel pyrometallurgical method of reprocessing uranium dioxide fuels after they have become contaminated by fission products in nuclear reactors, and more particularly, to a novel method of removing plutonium and rare earth fission products from such fuels.

As is well known, uranium dioxide is presently becoming widely used as a fuel in nuclear reactors, both in its naturally occurring condition and when "enriched" by the addition of the dioxide of its 235 isotope. After a reactor has been in operation for a period of time, the fuel becomes depleted and, of more practical importance, contaminated with fission products, some of which have comparatively large neutron absorption cross-sections, so that they interfere with, or "poison," the nuclear reaction to such an extent that their removal becomes necessary. For these reasons reactors are shut down periodically, their fuel removed, and fresh fuel substituted; the used fuel then must be reprocessed in order to recover its undepleted portion as well as the fission products of economic value, and the transmutation products, one of which plutonium-239, is also fissionable by thermal neutrons and may be used as a fuel.

Up to the present, most reactor fuel reprocessing has been carried out by "wet methods" in which the fuel and its commingled fission and transmutation products are dissolved in some aqueous solvent such as nitric acid, and the resulting solution is separated into its components by various chemical methods such as selective precipitation, solvent extraction, ion exchange and the like; while not altogether unsatisfactory, such methods leave much to be desired for a number of reasons, both technical and economic. Because of the radioactive nature of the solutes the solutions must be kept very dilute in order to avoid boiling of the water, decomposition of the organic solvents and ion exchange resins, emulsification between aqueous and organic liquids, and other effects due to heat and radiation. This dilution requirement results in extremely large quantities of solutions to be handled, with consequent high costs for equipment and shielding, since all operations with the radioactive materials involved must be carried out by remote control or in "glove boxes." If a method could be worked out for the reprocessing of reactor fuel without the need for dealing with such large volumes of fluid, a very great saving, could be made by the reduction of the cost of shielding as well as in other respects.

Most attempts, however, to reprocess uranium dioxide fuels by other than wet methods have not been satisfactory. As might be expected, pyrometallurgical methods are quite successful in remoivng the more volatile fission products such as the gases krypton and xenon, the nonmetals such as iodine and bromine, and metals with low boiling points such as cesium and rubidium. This can be done by heat alone, and thereafter a number of other fission products can be removed by introducing oxygen so as to form volatile oxides and other volatile compounds which are then removed by heat. In this second category are ruthenium, selenium, technetium, tellurium, and molybdenum; the removal of molybdenum is not always complete. After the removal of all the fission products which will volatilize, either alone or with the help of oxygen, it is necessary to reduce the particle size of the dioxide fuel and its commingled substances in preparation for the next step about to be described; this size reduction is best carried out by successive oxidations and reductions which cause crumbling by reason of the successive changes in crystal structure. After the particle size has been reduced sufficiently, a molten reducing metal of the group consisting of zinc and cadmium is introduced to the crumbled mixture, and this causes quite a number of metals to go into the metallic state, whereupon they alloy with the reducing metal and the molten metal phase may then be separated from the solid oxide phase consisting of the oxides of metals such as uranium, rare earths and plutonium which are still not reduced. The molten metal phase may be decanted, filtered or otherwise separated in a manner known to the art. Among the metals which are reduced and may be separated in this manner are antimony, palladium, rhodium, the molybdenum not removed by the previous steps, and a number of others.

None of the procedures so far described are effective in separating the rare earth fission products or plutonium from uranium, both of which separations are necessary for successful fuel reprocessing. None of these will volatilize alone at any practicable temperature, nor is it possible to volatilize them in the form of any compounds attainable under practicable pyrometallurgical conditions. So far as reducing them is concerned, their large free energies of formation rule out reduction by either zinc or cadmium, and while theoretically they could be reduced by metallic calcium, this metal is actually too effective for the purpose since it reduces all metal oxides, including those of uranium, indiscriminately, thereby defeating the primary aim of achieving separation.

It is the object of our invention to provide a process whereby uranium dioxide fuels may be metallurgically reprocessed after being depleted in nuclear reactors.

It is a further object to provide a process whereby oxides of the rare earth elements or plutonium may be metallurgically separated from uranium dioxide and other metallic oxides.

It is a further object to provide a process whereby the oxides of plutonium, lanthanum, samarium, praseodymium, yttrium, neodymium and cerium may be metallurgically separated from uranium dioxide.

It is a further object of the invention to provide a method of reprocessing uranium dioxide fuels without the use of aqueous solvents.

All the foregoing objects are attained by our discovery that, contrary to what might have been expected from available thermodynamic data, in a system where the solvent is a molten metal of one or more of the group consisting of zinc and cadmium, the oxides of plutonium, the rare earth fission products, barium and strontium, are reducible to the metallic state by uranium metal itself, with the result that an alloy of these elements and the solvent metal separates into a discrete phase from the other oxides. The molten metal phase may then be removed, leaving the uranium dioxide relatively free of those elements which have thermal neutron cross-sections of sufficient size to make them objectionable, so that it can be returned to the reactor for an indefinite number of re-runs.

In the drawings:
FIG. 1 is a flow sheet drawing showing the process of our invention; and
FIG. 2 is a graph showing the free energies of formation in kilocalories per gram-atom of combined oxygen of a number of oxides plotted against temperatures in degrees Kelvin.

Figure 2:
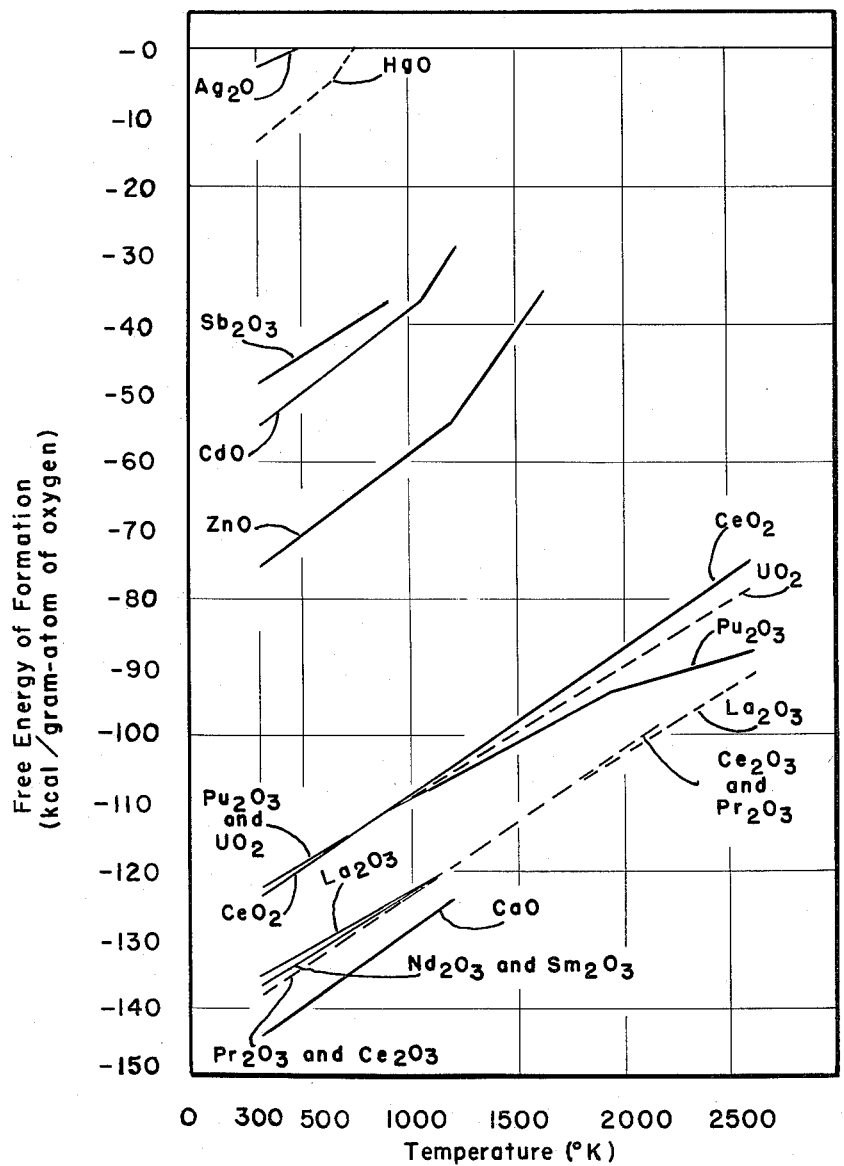

In order to illustrate the thermodynamic aspects of the invention, attention is directed to FIG. 2 which is a superimposed graph of certain curves taken from the first three graphs appearing in the United States Atomic Energy Commission publication, ANL–5750, "The Thermochemical Properties of the Oxides, Fluorides, and Chlorides to 2500° K." The free energies of formation of a number of oxides in kilocalories per gram-atom of combined oxygen are plotted as ordinates against abscissae of temperatures in degrees Kelvin; as can be seen, the most easily reducible oxides such as $Ag_2O$ and $Hg_2O$, which go to the metallic form merely on mild heating, have the smallest negative free energies near the top of the graph, whereas at the opposite extreme, the curve for CaO is nearest to the bottom. By thermodynamic principles only a metal of an oxide lower in the scale is capable of effectively reducing an oxide above it; thus calcium metal could be expected to be a powerful reducing agent, as it is, whereas silver and mercury are weak reducing agents because of the small free energies of their oxides, the term "free energy" as used herein being understood to be of negative sign as is the customary thermodynamic practice. The ability of zinc, already referred to, to reduce such fission products as antimony is quite in accord with thermodynamic theory as indicated by the graph, and the theoretical possibility of using calcium to reduce the rare earths is also evident, although, as explained above, this has disadvantages that make it too impractical to put to use.

To be sure, at temperatures of about 500° K. and above, the free energy curve for $CeO_2$ is above that of $UO_2$, which suggests the possibility of using uranium metal to reduce $CeO_2$; this is quite correct and an initial reduction readily takes place according to the equation:

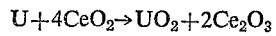

$$U + 4CeO_2 \rightarrow UO_2 + 2Ce_2O_3$$

Once this reaction is completed, however, any further reduction would not be expected since the sesquioxide product has a free energy curve well below that of uranium dioxide at all temperatures as can be seen by reference to the graph. Likewise, the curve of plutonium sesquioxide, although it coincides with that of uranium dioxide at lower temperatures, diverges away from it at around 1000° K. so that even if some reducing action at lower temperatures is theoretically possible, it is too slow to be practical. The use, therefore, of uranium to reduce plutonium and the rare earth oxides to the metallic state would not have seemed practical, but with the molten metal solvent system above referred to, our method of using uranium as a reducing metal becomes operative. It has been suggested this is due to the fact that in the solvent system mentioned the ions of plutonium and of the rare earth elements have very low activity coefficients. While we believe that this theoretical explanation is probably sound, we do not wish to be rigorously bound by it; in any event we have found that in a system where a metal of the group above mentioned may be considered as the solvent the oxides of plutonium and the rare earth elements may be reduced by uranium when added in stoichiometric proportions or in excess thereof, with the result that a discrete metallic phase forms including plutonium, rare earth metals, and solvent metal. Any excess uranium that may be present will, of course, enter the metallic phase as well, but if proper stoichiometric principles are observed this difficulty will not be encountered.

This procedure has the additional advantage of providing a convenient means for enriching the oxide fuel being reprocessed if the reactor is of an enriched fuel type. In that case, the uranium used as a reducing agent may be the 235 isotope or an enriched isotope mixture containing it. In the case of natural uranium reactors a slightly enriched uranium may advisably be used in order to bring up the proportion of uranium-235 to the level found in nature.

Our discovery, it will be understood, is to be carried out after the volatile fission products have been removed by volatilization, alone or with the help of oxygen as above explained, and the oxides reducible by a number of the group consisting of zinc and cadmium have been reduced. The last step may be followed optionally by separating the metal phase from the unreduced oxide phase and then taking a fresh amount of molten solvent metal to carry out the reduction of plutonium and rare earth oxides by means of uranium as a reducing agent. However, it is more economical to let the same metal from the group mentioned serve the dual purpose of a reducing metal for those oxides reducible by it, and as a solvent metal for the reduction by means of uranium of the invention. The two steps may be carried out in the same vessel simultaneously and the order in which the oxide mixture, the dual purpose metal and the uranium is introduced is not important from a theoretical point of view, although from an economic point of view it is sometimes advisable to introduce the dual purpose metal first and allow a sufficient time to elapse to permit it fully to reduce all oxides which it is capable of reducing. In this way, the amount of costly uranium required may be held to a minimum, but on the other hand, if cost is less of an object, it is more convenient to introduce the dual purpose metal and the uranium together.

The reducing steps of our invention are preferably carried out at a temperature of 700–800° C., which is also the preferred temperature for the reductions by means of the dual purpose metal; these temperatures are not critical in a strict sense, but thermodynamic considerations make this the most practical range for achieving the reactions in question within a reasonable period of time. Vigorous mechanical agitation should be provided to insure thorough contact between the molten metals and the oxide mass.

In order to expedite the reducing reactions of both the dual purpose metal and the uranium, it is advisable, as above stated, to reduce the particle size of the oxide mixture before hand. This can best be done by successive oxidations and reductions of the oxide mixture by oxygen gas and hydrogen gas; the oxygen oxidizes the $UO_2$ to $U_3O_8$ quantitatively or substantially so, and the hydrogen reduces the $U_3O_8$ back to $UO_2$, and the consequent changes in crystal structure bring about a crumbling effect; while $UO_2$ has the same crystal structure in a geometrical sense in all cases, the successive reductions do not remake crystals of the same size, but smaller ones of the same shape which causes the crumbling. The oxidations are carried out at about 300° to 500° C. for about 15 minutes or longer for each oxidation, except that on the first cycle times of 45 minutes may be required if the initial particle sizes are large. The reductions are carried out for about 15 minutes or longer at about 600° to 800° C.; it is possible that for high burnup and short-cooled material having considerable radioactive self-heating, it may not be necessary to supply heat, but rather to cool by suitable means such as liquid sodium to keep within the ranges mentioned. Considering one gaseous oxidation followed by gaseous reduction as a cycle, from two to six cycles, and preferably three, are required to produce oxides of the proper size for the ensuing reductions. Further details of the invention may be gathered from our preferred mode for carrying it out, as set forth in the following example:

*Example*

11,350 grams of fresh $UO_2$ fuel consisting of granules, having an average particle size of ⅛ to ¼ inch enriched to 50% $U^{235}$, are placed in a nuclear reactor. Before being placed in the reactor this fuel has a total uranium content of 10,000 grams, the balance of 1,350 grams being oxygen, and after withdrawal from the reactor, the $U^{238}$ content of the spent fuel is 5,000 grams, the $U^{235}$ content 4,800 grams, the fission products content 200 grams, the oxygen content remaining about unchanged, as indicated in the process flow sheet of FIG. 1. It will be understood that in the flow sheet the quantities not otherwise designated are to be considered to represent grams; F.P. means fission products, Group A means the volatile elements or oxides such as Kr, Rb, Tc, Ru, Te, I, Xe, and Cs, Group B means Mo, and Group C means elements soluble in U–Zn such as Y, Zr, Nb, Mo, Rh, Pd, Ag, Cd, In, Sn, Sb, Ba, Sr, and the rare earths. The spent fuel is then placed in a stainless steel vessel with an oxygen atmosphere and electrically heated to about 500° C. for 45 minutes. This drives off the volatile elements and volatile compounds of Kr, Rb, Tc, Ru, Te, I, Xe, Cs, and Se, and also removes about 50% of the molybdenum content. The vessel is evacuated and then the temperature of the vessel is raised to 700° C. and the vessel is filled with hydrogen for 15 minutes, after which the vessel is again evacuated and cooled by cooling coils to 500° C. and the oxidation repeated for 15 minutes. This oxidation-reduction cycle by means of oxygen and hydrogen gases is carried out three times. The resulting mixture of oxides is then transferred to a tantalum vessel and 40,000 grams of liquid zinc containing in solution 236 g. of fully enriched uranium are introduced into the vessel at a temperature of about 750° C. Vigorous agitation by means of a tantalum stirrer is provided in order to intermix the molten zinc and the oxide mass for a period of about 8 hours at 750° C. in an argon atmosphere. At the end of this period the agitation is discontinued but the temperature of the vessel still maintained at about 750° C. until the contents separate into a lighter liquid metal phase and a heavier solid oxide phase which settles to the bottom; the liquid phase is then removed by pressure siphoning it out of the tantalum vessel and the tantalum vessel containing the oxide phase is transferred under an inert atmosphere to a still in which at a pressure of 10–100 mm. Hg and a temperature of 600° to 740° C. the residual zinc, about 400 grams, is distilled out of the oxide mass. The composition of the latter is 5010 grams of $U^{238}$ and 5006 grams of $U^{235}$. Material of this analysis is entirely suitable for reuse in the enriched type of nuclear reactor from which the spent fuel was originally taken.

What is claimed is:

1. A method of reprocessing spent oxide fuel consisting of uranium dioxide, and the oxides of the fission products and transmutation products from nuclear reactors, comprising heating said fuel in an oxygen atmosphere to drive off the volatile fission product elements and compounds, then cyclically oxidizing the resulting product at 300°–500° C. with oxygen gas whereby substantially all the $UO_2$ of the product becomes oxidized to $U_3O_8$, and partially reducing it with hydrogen gas at 700°–800° C. whereby substantially all the $U_3O_8$ is partially reduced to $UO_2$, the said oxidations and reductions being repeated for a sufficient number of cycles to reduce the particle size, then immersing it in a dual purpose liquid selected from the group consisting of molten zinc and molten cadmium under an inert atmosphere to bring about the reduction to the metallic state of the oxides reducible by the liquid, adding to the liquid uranium in the stoichiometric amount to bring about the reduction of the oxides of the class consisting of the oxides of the rare earth elements and plutonium to the metallic state, then separating the resulting liquid metal phase from the solid oxide phase.

2. The method of claim 1 where the heating to drive off the volatile fission product compounds is carried out at about 300° to 500° C., where the cyclic oxidation of said product comprising $UO_2$ is carried out at about 500° C. and the cyclic partial reduction of the product comprising $U_3O_8$ is carried out at about 600° to 800° C., where reduction by the dual purpose liquid and the reduction by the uranium within the solvent liquid and the decantation are carried out at about 700° to 800° C., where the distillation is carried out at about 600° to 740° C. at a pressure of about 10 to 100 mm. Hg.

3. A method of reducing the oxides of the class consisting of the oxides of the rare earth elements and plutonium to the metallic state, comprising immersing them in a solvent selected from the class consisting of molten zinc and molten cadmium and adding thereto metallic uranium in the stoichiometric amount needed to reduce the oxides to the metallic state to bring about a reducing reaction which is carried out at 700° to 800° C. and accompanied by agitation.

4. A method of separating the oxides of the class consisting of the oxides of the rare earth elements and plutonium from a mixture comprising oxides of uranium, comprising immersing the mixture in a solvent selected from the group consisting of molten zinc and molten cadmium, adding thereto metallic uranium in the stoichiometric amount needed to reduce the oxides to the metallic state to bring about a reducing reaction, maintaining the temperature of the reducing reaction at 700° to 800° C. accompanied by agitation, and after completion of the reaction separating the resulting liquid metal phase from the solid oxide phase by decantation of the liquid metal phase followed by distillation of the residual liquid metal from the oxide phase.

References Cited in the file of this patent

A.E.C. Research and Development Report HW 51748, "Fabrication Behavior of Some Uranium Dioxide Powders," Dec. 1, 1957.